US010977827B2

(12) United States Patent
Mauchly et al.

(10) Patent No.: US 10,977,827 B2
(45) Date of Patent: Apr. 13, 2021

(54) MULTIVIEW ESTIMATION OF 6D POSE

(71) Applicants: J. William Mauchly, Berwyn, PA (US); Joseph T. Friel, Ardmore, PA (US)

(72) Inventors: J. William Mauchly, Berwyn, PA (US); Joseph T. Friel, Ardmore, PA (US)

(*) Notice: Subject to any disclaimer, the term of this patent is extended or adjusted under 35 U.S.C. 154(b) by 204 days.

(21) Appl. No.: 15/937,424

(22) Filed: Mar. 27, 2018

(65) Prior Publication Data
US 2019/0304134 A1    Oct. 3, 2019

(51) Int. Cl.
*G06T 7/73* (2017.01)
*G06T 15/20* (2011.01)
*G06N 3/08* (2006.01)

(52) U.S. Cl.
CPC ............ *G06T 7/75* (2017.01); *G06N 3/08* (2013.01); *G06T 15/20* (2013.01); *G06T 2207/20081* (2013.01); *G06T 2207/20221* (2013.01)

(58) Field of Classification Search
CPC . G06T 7/75; G06T 15/20; G06T 2207/20081; G06T 2207/20221; G06N 3/08
See application file for complete search history.

(56) References Cited

U.S. PATENT DOCUMENTS

| | | | | |
|---|---|---|---|---|
| 9,292,967 B2* | 3/2016 | Black | ............. | G06T 17/20 |
| 9,489,744 B2* | 11/2016 | Black | ............. | G06K 9/00369 |
| 2013/0249908 A1* | 9/2013 | Black | ............. | G06K 9/00369 |
| | | | | 345/420 |
| 2016/0275693 A1* | 9/2016 | Black | ............. | G06T 15/20 |
| 2017/0069102 A1* | 3/2017 | Black | ............. | G06T 17/20 |
| 2019/0206084 A1* | 7/2019 | Noble | ............. | H04N 5/247 |
| 2019/0213389 A1* | 7/2019 | Peruch | ............. | G06K 9/00201 |
| 2019/0279009 A1* | 9/2019 | Srirangam Narashiman | ............. | |
| | | | | G06T 7/248 |
| 2020/0020117 A1* | 1/2020 | Daehler | ............. | G06T 7/10 |

OTHER PUBLICATIONS

Tompson, Jonathan, et al. "Efficient object localization using convolutional networks." Proceedings of the IEEE Conference on Computer Vision and Pattern Recognition. 2015. (Year: 2015).*

* cited by examiner

*Primary Examiner* — Bobbak Safaipour

(57) ABSTRACT

This disclosure describes a method and system to perform object detection and 6D pose estimation. The system comprises a database of 3D models, a CNN-based object detector, multiview pose verification, and a hard example generator for CNN training.
The accuracy of that detection and estimation can be iteratively improved by retraining the CNN with increasingly hard ground truth examples. The additional images are detected and annotated by an automatic process of pose estimation and verification.

1 Claim, 6 Drawing Sheets

CNN Training

Model Refinement

US 10,977,827 B2

MULTIVIEW ESTIMATION OF 6D POSE

BACKGROUND OF THE INVENTION

It has become common to have multiple video cameras, such as surveillance cameras, in rooms, buildings, and open spaces, both public and private. While in the past, humans watched these images to look for dangerous behavior, today there are many more uses for the information they provide, and many more ways to collect and process it.

It would be desirable to estimate the precise position of objects within some physical space. Many advanced visual recognition systems use Convolutional Neural Networks (CNNs), however today's object detection systems only locate an object to within a general rectangular bounding box on a 2D image. Even systems which can generate a per-pixel label for the class of the object do not reveal the object's 6D pose (the 3D location of the object in real-world coordinate system and the 3D rotation of the object). Another hindrance to accurate object detection is that CNNs require large amounts of annotated training data.

Further, although there exist systems with multiple cameras with partially overlapping views, it is extremely difficult to incorporate their joint information into a unified view of a physical space.

FIELD OF THE INVENTION

The method and system disclosed relates to the field of object detection, and in particular object detection, localization, and pose estimation in a physical space.

DESCRIPTION OF THE RELATED ART

Discovering the placement of objects in a physical space has been a long-standing problem in computer vision. Convolutional Neural Networks (CNNs) have proven to be very successful for many vision tasks, including object detection.

Deep CNNs need to be trained with a very large amount of annotated image data. Great strides have been made by enlisting humans to annotate thousands of images with data that shows the class and location of objects in the images, however this is costly and time-consuming.

Additionally, human labor is not accurate enough for certain types of image annotation. For example, it may be desired that a system would classify many different machine parts which look similar, or it may be desired to have a system which identifies the 6D pose of an object in a physical space, which is difficult for a human to estimate accurately.

The use of so-called cross training can mitigate but not eliminate the need for accurately labeled training data. It is therefore desirable that image annotation would be done automatically.

To this aim it has been proven somewhat useful to use computer-generated 3D renderings to train CNNs. If a 3D computer model of the object of interest is available then the model can be rendered from hundreds or thousands of different viewpoints. These synthetic renderings become the training images for the CNN. This approach can work up to a point, but it is very difficult to make these images be as diverse or as realistic as actual photographs of the physical object in the intended environment.

In our application it is desirable to use a 3D model that accurately represents a particular real-world physical object. In other object classification tasks, this is not necessary, because the detector is trained to generalize and find many diverse examples (of a chair, for example.) To locate and pose a particular object, however, the 3D model should closely resemble the real object. In practice, the synthetic rendering may not represent the real-world appearance of the object for various reasons: because the model has inaccurate shape, color, or texture; because of object deformations; because of lighting and shadow variations, or because of occlusion from other objects in the physical space.

The practice of bootstrapping, or "hard example mining" can improve CNN performance. This is a technique for choosing, for further training, image examples that the detector failed to detect correctly. As opposed to the technique of automatic annotation that we will disclose here, bootstrapping relies on pre-existing accurate annotation. Once that is established, the computer can automatically "mine" examples that it fails to detect correctly, whether false positives or false negatives.

We include by reference: Object Detection and Classification in Images. US Patent Application US20170206431A1. It introduces the techniques now known as Region-based Convolutional Neural Networks (RCNN), region-based object detection and Deep Convolutional Neural Networks. It also covers the implementation of such systems on computers and networks using software. It will be known by someone versed in the fields of object detection and neural networks that such methods and systems rely on computers and that they can be implemented on a vast variety of configurations of networks, data storage units, data paths and computational units.

SUMMARY OF THE INVENTION

The system and method described here will estimate the precise location and pose of objects within some physical space. The invention makes use of, as input data, multiple images of a physical space taken from different viewpoints. The system comprises a CNN-based object detector and pose estimation module, a multiview pose verification module, and a hard-example generator. The method includes the processing a plurality of images to generate pose estimates, and verifying the pose estimates with each other. This verified pose is further used in annotating images of objects to create hard training examples, which are used to train a CNN.

The CNN-based detection system should be built with the latest techniques and algorithms; this field is constantly advancing. The preferred embodiment includes the algorithm known in the literature as Faster RCNN. It is common practice to use a neural network that has been pre-trained on a large-scale object detection dataset like the Microsoft Common Objects in Context dataset (COCO). However even the best algorithms need exhaustive training data or they will continue to make errors. There will be false negatives (an object is not found) and false positives (an object is detected where none exists.) Usually the measurement of this performance, called accuracy, can only be evaluated on annotated data. That is, one must know the ground truth in order to determine if the detection is correct.

This system embodies a technique in which a detection can be both verified and refined, Multiview Pose Verification. Using this technique, an object can be verified, and therefore correctly annotated, automatically in new images that come in while the system is functioning. In particular, hard examples, those that the system got wrong, can be generated. By retraining the CNN detection system with these new annotated images, the CNN-based detector can be iteratively improved.

Another aspect of the invention provides a method to improve the quality and accuracy of 3D models of objects that appear in a physical space. Such improved models can in turn improve the pose estimation accuracy.

It is intended that the system be useful when incorporated in a continuous live tracking system, which would both locate and pose new objects but use information from the past to predict and verify.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to systems, methods, computer-readable instructions, modules, algorithms, hardware logic and/or operations as permitted by the context described above and throughout the document. Additionally, the terms "class," "category," "type," and "group" of objects in an image can be considered synonymous terms with regard to the classification of an object. Furthermore, the claimed subject matter is not limited to implementations that solve any or all disadvantages noted in any part of this disclosure.

DETAILED DESCRIPTION OF THE PREFERRED EMBODIMENT

Figure 1:
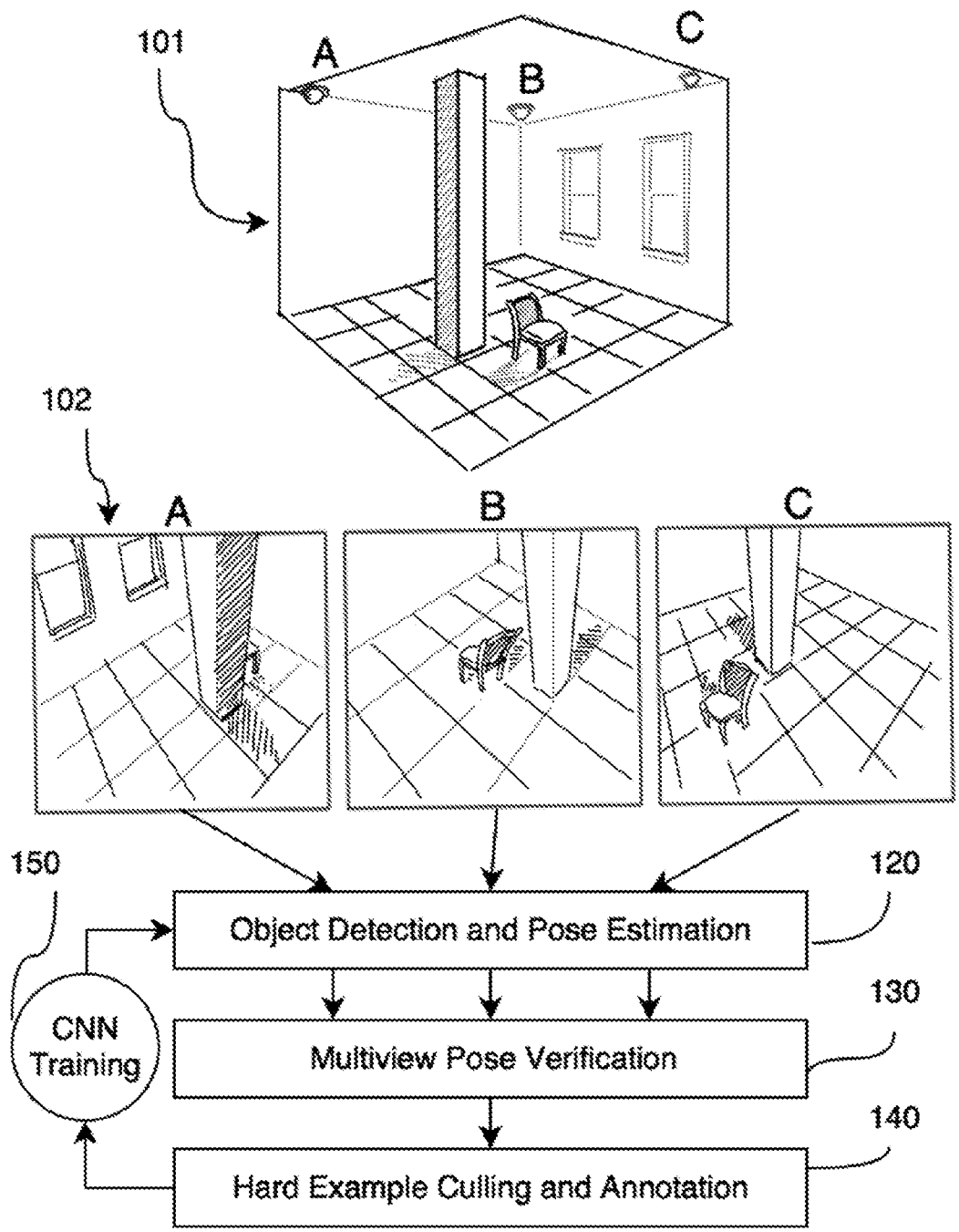
FIG. 1: An overview of the invention.

The system and method described here will estimate the precise position of objects within some physical space. For example, in a restaurant, which may be made up of several connected rooms, there may be a collection of chairs, tables, and of course the customers and work staff The system described here can report exactly where the tables and chairs and people are positioned in the physical space. It would then be possible to reconstruct a 3D model of the physical space, which could be rendered from an arbitrary viewpoint. The rendering could be made to look photographically accurate, if desired, or could be rendered with deliberate modification from the original physical space. For example, the people in the physical space could be rendered as generic humanoids, and as such not be personally recognizable. Or the physical space could be rendered from a birds-eye view, with the roof and ceiling removed, so that the viewer could see the entire physical space in one picture. Other use cases might include a retail store which includes merchandise on shelves, an airport terminal filled with people and bags, or the outside of an airport, with airplanes and vehicles coming and going. The use of the invention is not limited to these examples.

The system and method described here also includes a mechanism to improve the accuracy of its own performance by a training of the embedded CNN with automatically generated real-life hard examples. This is an advance over existing CNN systems which may be limited to machine-rendered training data or hand-annotated photographs.

The system and method described here also includes a mechanism to improve the accuracy of the 3D models of the objects in the physical space.

The pose of an object, in the context of this disclosure, is a collection of parameters which represent the location of an object in 3D space, and its angular rotational orientation. Location, or translation, is of course defined in units such as meters in x, y and z coordinates, in reference to some agreed-upon origin. Orientation is likewise usually defined in angular units of rotation, frequently degrees. There are several different ways of representing the three dimensions of angular freedom such as by Euler angles or by Quaternions. We will collectively refer to a set of three translational and three rotational dimensions as "6D pose." It is often more convenient for computation to represent the 6D pose with matrices which have more than 6 numbers. The particular form of the mathematics is not limiting to our claims as they can all be shown to be equivalent for our purposes. For a given physical space, a single, common coordinate system can and should be established.

There are many imaging devices which can produce the digital images used by this invention; these include monochrome (black-and-white) cameras, RGB (color) cameras, infrared cameras, and various types of depth cameras and even LiDAR. The preferred embodiment uses simple RGB video cameras, which are inexpensive and robust. The claims are not limited by this use.

The intrinsic and extrinsic calibration parameters of the camera images are required, as is common in photogrammetry. The external calibration information portrays the 6D pose of the camera itself. It can be determined once, in a manual calibration procedure. In the case of a moving camera, such as might be mounted on a vehicle, the pose of the camera is estimated dynamically per image. The techniques to do image calibration are well known to one who is practiced in photogrammetry.

The system relies on the existence of multiple images of the same physical space from different viewpoints. In one embodiment these images could be taken simultaneously from different cameras; in another embodiment they could be taken as a video sequence from a moving camera, or in another they could be both taken from different cameras and at different times. Multiple views of a "physical space" will refer to images in which the objects within some physical space have not moved; that is that each object had the same world position in all the images.

The family of algorithms known as photogrammetry (which includes structure-from-motion) are related but distinctly different from the disclosed method. In photogrammetry, a set of 100 or more photos are gathered; a collection of unnamed feature points are determined in each image by examining pixel-level properties like color and contrast. These feature points are then matched with feature points in other images. A fundamental property and limitation of this process is that any image needs another that is relatively close to it, so that a sufficient number of the matching features can be found. Photogrammetry assumes that the lighting is unchanged in the images. By contrast, the method disclosed can use as few as two images which can be from arbitrary viewpoints, even on opposite sides of the target object. Additionally, the method is insensitive to lighting variations and could even use two images from different image modalities, such as infrared, LiDAR, or RGB. These benefits come from the technique of using deep object features, rather than pixels, to precisely locate the object in the physical space, and from the use of premade 3D models.

In some embodiments the images may be assembled into a database and/or delivered over a data network to a computer or a network of computers. In other embodiments the image processing happens close to the camera, even within the camera's own processor.

It is the purpose of this system to determine the 6D pose of an object from a group of images. It includes a sub-system which can determine the 6D pose of an object from one image. For a single image, this object detection and pose determination may be inaccurate due to a variety of factors. (e.g. the object may be partially occluded by another object or a passing vehicle.) Still, it is desirable to make the single image detection as accurate as possible; it will make the multiview system more robust. To this aim the system includes a method for "sharpening" the object detector with examples of hard-to-detect objects.

The description of the invention, in the preferred embodiment, shall proceed with a detailed discussion of the figures.

FIG. 1 is an overview of the invention. A real-life physical space is being captured by one or more cameras (at 101, A, B, and C) to produce a first set of images with a plurality of partially overlapping camera views (at 102, A, B, and C). These images show different viewpoints of the one physical space.

Figure 2:
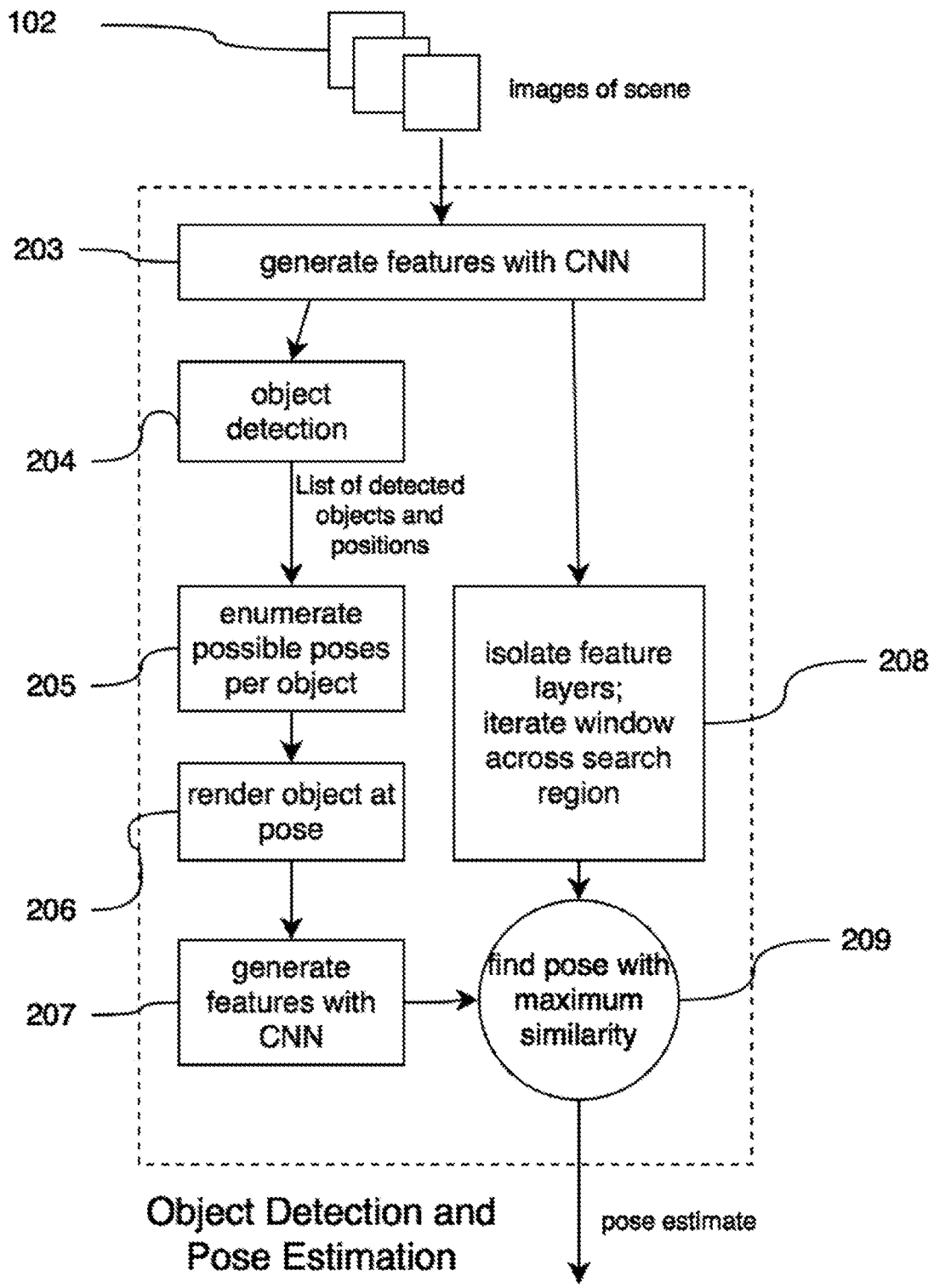
FIG. 2: CNN-based object detection and Pose Estimation

The set of images are individually analyzed by a CNN-based Object Detection and Pose Estimation 120 (further described in FIG. 2.) The output of the pose estimator is a list of objects with their estimated poses. Each real object may have multiple estimated poses derived from different images. A Multiview Pose Verification process 130 evaluates the list to produce an "object pose" (a verified 6D pose) for each object. That process is further described in FIG. 3. At 140 a second set of images which have been culled from the first set of images are designated hard examples and annotated with information about verified object poses. This Hard Example Culling and Annotation are further described in FIG. 4. The hard examples are used in an offline process to train a CNN 150. CNN Training is detailed in FIG. 5.

Object Detection and Pose Estimation

As shown in FIG. 1, a component of the disclosed method is a process which performs Object Detection and Pose Estimation on a single image. FIG. 2 illustrates one implementation of an object detection and pose estimation method, with the understanding that other methods can be used to determine this information. The invention relies on the inclusion of such a component, but not on the exact implementation of it.

In the preferred embodiment the object detection and pose determination are accomplished by a two-step process, detection and a subsequent pose refinement. In another embodiment both the detection and pose estimation could be determined by the same algorithm. At the time of this writing, there is not a published algorithm which achieves highly accurate positioning of objects within a 3D model of the physical space from a single RGB image, but such a technique may emerge. It is intended in this disclosure to include the use of such a variation in the component part to be included in the larger method claimed here.

As shown in FIG. 2, the input to the pose process is a collection of images 102 of a physical space from different viewpoints. The images are processed by a CNN 203 which has been trained to discriminate objects, producing a rich set of features. The image features are further analyzed region by region to detect objects 204. The preferred embodiment uses the algorithm known as Faster RCNN to perform object detection. In its conventional use, it can identify an object in an image by way of a bounding box, and also identify the objects class. For the CNN to learn about a particular class, it must be shown thousands of pictures of different instances of that class. In that context, a class might be the class of all chairs, or all automobiles, or people, or cats. The output of Faster RCNN is a list of object detections.

In the preferred embodiment the RCNN is trained to recognize particular objects which are known to appear in the physical space. A 3D "CAD" model of each object is first obtained. For training it is necessary to obtain annotated images of each object in the physical space, from a variety of viewpoints. It is convenient to digitally render images of the 3D models in various poses and lighting conditions, and machine-annotate them. These rendered images may not match what the object will look like when it is in the physical space, due to differences in the 3D model's accuracy, the lighting, object deformation, and due to occlusion from other objects. Thus, the first trained RCNN may make mistakes and mischaracterize the objects it detects. The invention includes a self-improvement mechanism to remedy this.

The CNN 203 produces a feature set for that image; more specifically it makes a feature vector for each pixel in the image. On higher layers the feature vectors represent groups of pixels, having less spatial resolution. The "regional" part of RCNN is shown as the object detection block, 204. The output is a list of object detections. Each object detection contains three pieces of information: the ID or class of the object, the x and y coordinates of a bounding box around the object in the 2D domain of the image, and a confidence value.

In this first embodiment, the RCNN step is followed by a pose estimation step which only requires the 2D bounding box and the ID or class of the object as input. In another embodiment, the RCNN also produces estimated pose information, which is then used to make the pose refinement step more efficient. For details on such a technique, see the paper entitled "Render for CNN."

Su, Hao, et al. "Render for cnn: Viewpoint estimation in images using cnns trained with rendered 3d model views." *Proceedings of the IEEE International Conference on Computer Vision.* 2015.

The initial pose estimation step 205 takes as input the 2D bounding box and then estimates, based on the size and/or shape and/or position of the bounding box, the rough location of the object in 3-space, and a search range around that location.

The pose refinement process is a search for a rendered image of the object at a pose that most matches the input image. The search will try different candidate poses looking for a "fit." Some objects may have a restricted range of candidate locations or rotations. The search will evaluate various candidate locations and various possible rotations. This search will compare images in "feature space" by computing the feature similarity using a similarity measure, such as the cosine similarity.

The search for the correct, or closest 6D poses repeats a pose evaluation step until the pose with the greatest similarity to the one seen in the image is determined. The pose evaluation steps may comprise:
1. rendering a candidate image of a model of the object in the proposed pose 206, as it would be seen from the known camera pose and characteristics;
2. using a CNN to generate a feature vector of the candidate image 207;
3. isolating a windowed feature vector from the original image corresponding to a candidate position in the physical space 208;
4. evaluating a similarity measure, e.g. the cosine similarity function, between the features of the candidate pose and the windowed features of the original image 209.

The pose search culminates when all candidate poses have been evaluated. The location and pose with the greatest similarity are chosen as the output of the search. The output record, called the "pose estimate," contains the object ID and the 6D pose (the 3D location and the 3D rotation of the object in world coordinates) and also information about which camera viewpoint originally produced the observation.

In the preferred implementation the feature vectors are created using the CNN known as VGG-16 trained on the COCO dataset. Layers 8, 9 and 10 are concatenated to become the feature vector.

We have outlined how the pose of an object can be estimated for a single image. In a typical real-life usage, there would be a plurality of objects in a physical space. The pose estimation would occur for each object detected in an image. Then the detection is run on other images of the same physical space. Typically, an object that is detected from one viewpoint may also be found in other images whose view area overlaps. Redundant observations are merged in the next step.

Multiview Pose Verification

Figure 3:
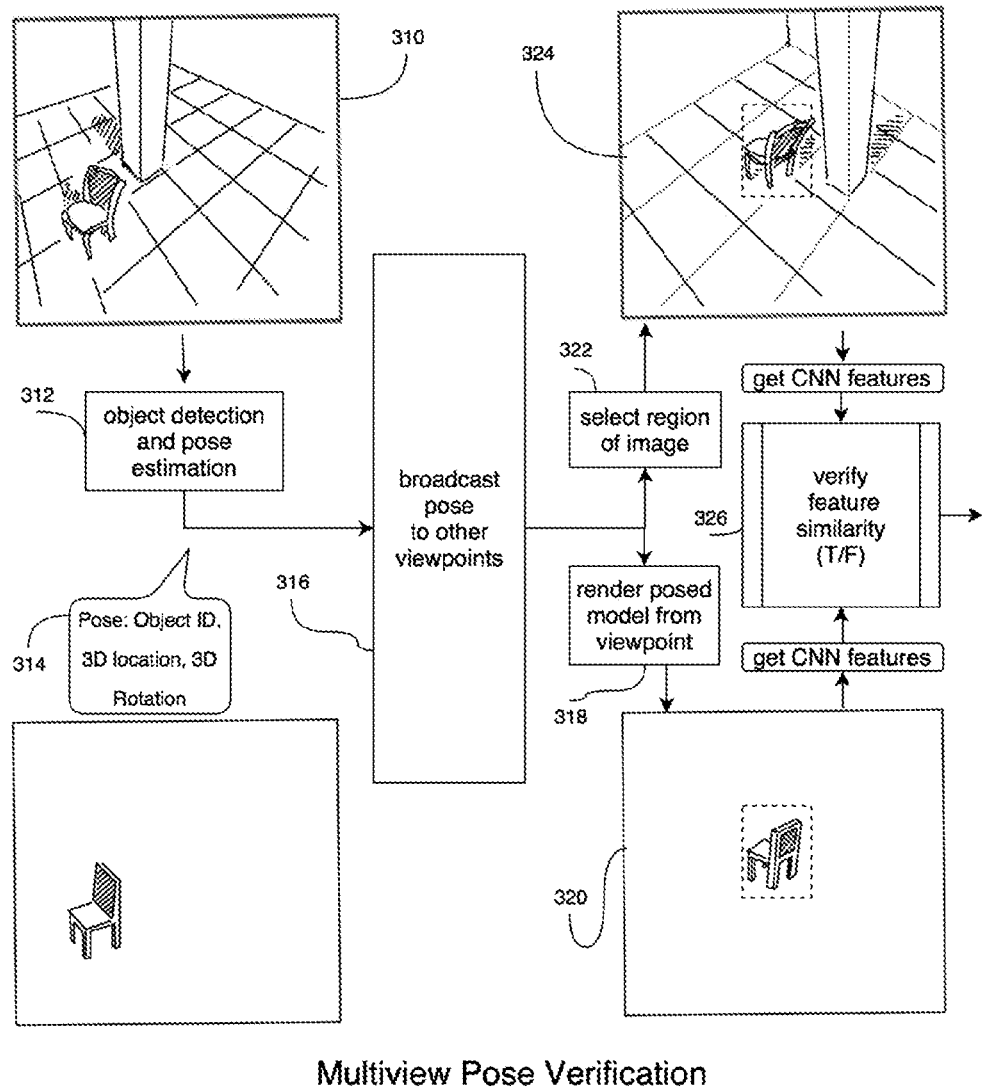
FIG. 3: Multiview Pose Verification

As shown in FIG. 1, the invention includes a system component called Multiview Pose Verification which will reconcile multiple pose estimations of an object into a single verified pose. That increases the system's pose accuracy beyond what a single image analysis can accomplish. This process is described next, and is shown in FIG. 3.

The previous step has produced a list of objects, and their pose estimates, from various viewpoints. The multiview pose verification task basically answers the question: "Is this object also seen in the same position by the other cameras?" There is still some real probability that the observations and pose estimations done for single images have errors, either false positives (extra objects) or false negatives (missed objects.) By "looking for" each posed object in the other cameras we achieve independent verification (or refutation) of the observation.

In one embodiment, verification is performed by comparing all the incoming poses estimates with each other. If the comparison finds that at least two pose estimates are "close enough" to each other, then the pose is considered verified. In such an embodiment two pose estimates are compared by computing the (Euclidean) distance between the two estimated object locations, and the angular distance between the two rotational vectors.

Two pose observations are labeled as "verified" if all of these are true:
  they are the same object ID,
  the estimated locations differ by less than a threshold of 5 cm and
  the estimated rotations differ by less than a threshold of 15 degrees.

This is a basic explanation of a simple but effective method of using multiple views to increase the confidence in a prediction. There are many other ways to leverage the increased knowledge gained from multiple looks at the same physical space. In another embodiment the accuracy of the pose estimates can be improved. For example, the accuracy of an estimate of depth (distance from the camera) may be less, and have greater variance, than estimates of x and y relative to the camera plane. From another camera with an orthogonal view of the object, that depth estimate could be refined.

In still another embodiment of the Multiview Verification, the system takes every pose estimation from a single viewpoint and evaluates it from all the other viewpoints. This embodiment is preferred, as it is quite robust, and it is further detailed with reference to FIG. 3.

FIG. 3 shows a process of Multiview Verification. A first image, 310, taken from a first perspective viewpoint, is processed by an object detection and pose estimation subsystem 312, such as one described previously. The output of this step is a pose estimate 314 which is made up of an Object ID, a camera ID, and a 6D pose, made up of a 3D location and a 3D rotation. This pose is depicted in the figure as a chair, in a certain place in a room, facing a certain direction.

The system "broadcasts" the pose into other views 316. In this context broadcast means that the pose, estimated from one viewpoint, is evaluated from all the other viewpoints available. From another camera view, the object will have a different pose relative to the camera, but since the camera pose is known, the relative appearance of the object is precisely defined.

In FIG. 3 a second image has been received which is from a second perspective viewpoint, which will be called a candidate image 324.

Pose verification uses a process very similar to pose estimation. Using a 3D textured model of the object, a renderer 318 creates a rendered image 320 of the object as it would be seen from the viewpoint of the candidate image. It is generated at the same resolution as the candidate image. From this rendered image 320 the system can precisely define the size and location of a bounding box which encloses the object. Both the candidate image 324 and the rendered image 320 are cropped to this bounding box. A CNN is used to extract high level image features for both the cropped candidate and the cropped render. The feature vectors both have dimension x, y and f where x and y are the length and height of the bounding box and f is the number of feature planes.

At 326 a decision is made whether this object, at this pose, is indeed visible in each of the viewpoint images considered. Visibility is determined by high similarity between the feature vector from the real image and the feature vector from the rendered image. The similarity between the two feature vectors is measured at 326 by computing a similarity measure, such as cosine similarity, between them.

The similarity thus measured can be compared to a threshold value to evaluate it, but a threshold may be hard to determine. In the preferred embodiment, a more reliable test is to evaluate the similarity across a range of x and y offsets, that is, with the two images shifted relative to each other by various amounts. In one embodiment the bounding box location may be scanned across a region of the candidate picture. If the features reach maximum similarity at the predicted location, then we designate that the object is visible, and the pose estimate is correct in this image.

In one embodiment of Multiview Verification, an object pose estimate is "verified" when it is found to be correct in at least one other view. Depending on the number of views available, some other threshold or criteria could be used to make the final verification decision.

This disclosure does not require a particular type of multiview verification or multiview confidence computation. We wish to claim a method that includes multiview verification as a component step. The insight here is that this step can, without additional human intervention, create a more accurate object detection and pose estimation system than can be made with a single-view system. This increased accuracy and confidence can then be "fed back" to improve the single-view component. This feedback is the subject of the next section.

Hard Example Culling and Annotation

We have described a system in which multiple cameras with overlapping views are trained on a physical space containing a collection of objects and perhaps people. At any given moment, a particular object detector may fail to recognize an object. A human could walk in front of an object, or pick it up, and partially obscure the object. The sun could cause glare on the object. The object could become deformed in some way, for example someone opening a suitcase or folding a paper. In such cases, it is likely true that these objects might be still recognizable to a human but have failed to be detected. The object detection system has never learned to recognize these special cases. This is because it has not seen any training data for these special cases.

It is the object of the disclosed system to automatically generate annotated images of objects in special situations which are unusual and hard to detect. These images are valuable when they are used to train object detectors such as the component detectors used in this invention. The resultant detector will be more accurate and will be more likely to catch these unusual cases. It is clear that this "feedback" process can be used more than once to increasingly sharpen the acuity of both the single view and the multiview object detection systems.

It would be incorrect to assume that when an object has been verified in a physical space, then it should be visible in all views of that physical space. Objects occlude other objects. Occlusion can cause an object to be completely invisible. No manner of training will teach a machine to see a dog behind a truck. The creation of meaningful training data therefore requires a way to check if indeed the object is visible in an image. A human can do this easily, but that is what we are trying to avoid. We want an automatic visibility test.

In one embodiment, the visibility test uses a process very similar to pose estimation. From the object model the system renders a picture of that object as it would be seen from the viewpoint of the candidate image. A feature vector is produced with just the x,y bounds of the rendered object. Those features are compared to a like-sized window of features from the image being evaluated. The window location may be moved around a small search range near the known pose. If the features reach maximum similarity at the known location, then we designate the object as visible.

In another embodiment the visibility test has already been performed in the multiview verification.

Figure 4:
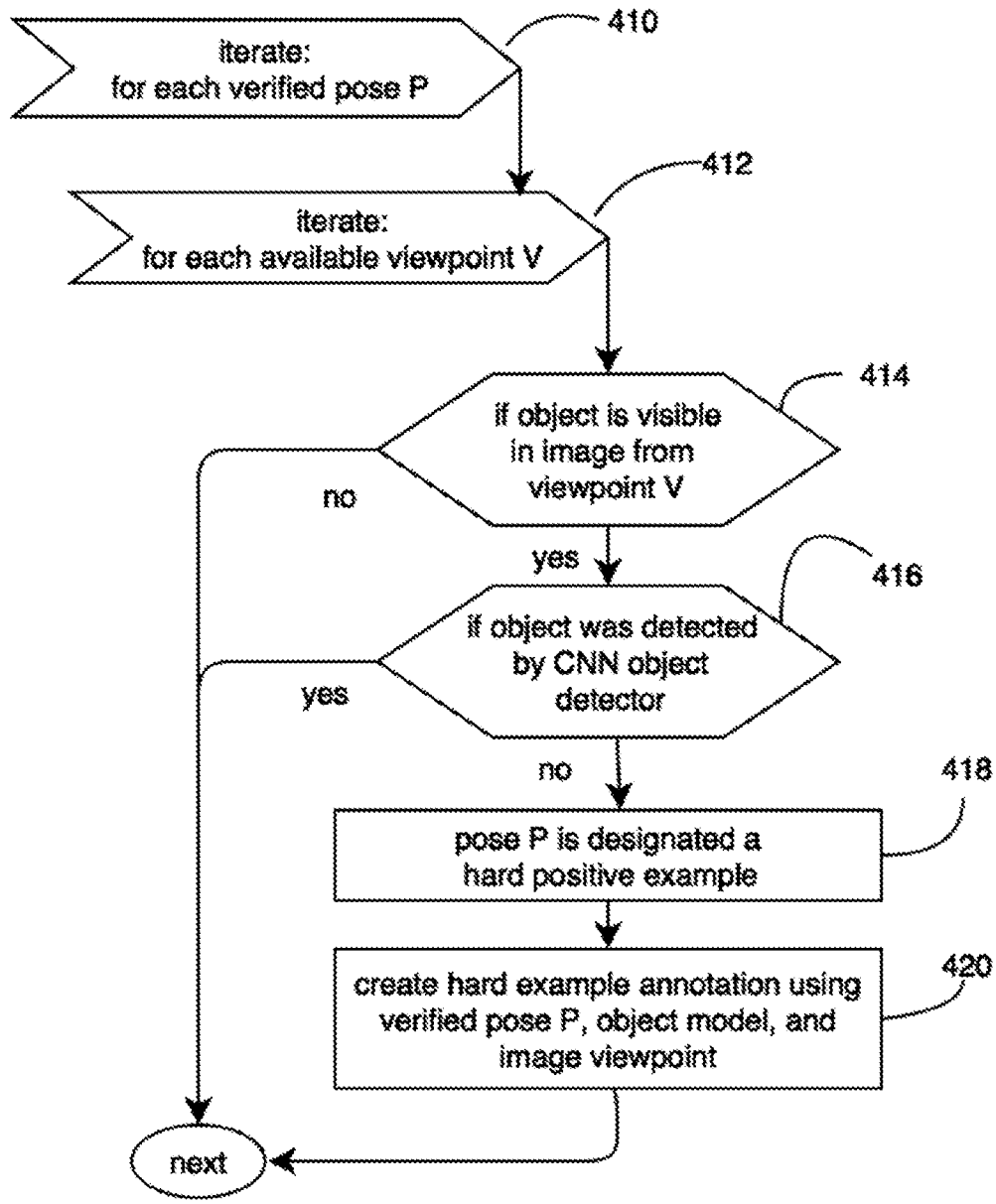
FIG. 4: Hard Example Culling and Annotation

Referring now to FIG. 4, the Hard Example Culling and Annotation process is described. The input to the process is a collection or list of verified poses, as determined by the multiview verification described previously, and all the images of the physical space from all viewpoints.

The algorithm iterates over all the verified poses 410. Each verified pose gives the exact location and rotation of some specified object in the physical space.

For a given pose P, the algorithm iterates over all the available viewpoints 412. The image from that viewpoint has a known relationship to the physical space, and therefore the object, if it is visible, will be in a known location in the image.

At 414 a visibility test determines if the object is visible in this image. As discussed earlier, the visibility test may take a number of forms. It can be more discriminative than a simple object detector because it effectively knows exactly which pixels of the image to look at and it knows exactly what location and rotation the object will have. At least the exact bounding box is determined.

If the object is visible, then a second decision is made 416. The system checks whether this visible object was already detected by the CNN-based object detection system at the head of the pose extraction process. (tests 414 and 416 can be made in any order.)

If the test 414 is true and the test 416 is false, then this Pose/viewpoint pair is designated a hard example 418. We note that since this failure-to-detect represents a false negative, then this object, in this image, is designated a hard-positive example. The process proceeds to annotation 420. At this step metadata is created which will allow the image to be used as CNN training data. The metadata will at least contain the ID of the verified object and its exact bounding box. It can also contain the pose information. Said pose information may be transformed to represent the rotational pose of the object with respect to the camera. It can also contain a mask which indicates which pixels contain the object.

We have just described how a false negative, an image with an undetected object, is culled. Examples of false positives are also useful for training a CNN, where the CNN detected an object that is not actually in the physical space. Such false detections will become "hard negative" examples.

Referring now to FIG. 3, multiview pose verification starts with an object pose proposal, and proceeds to a test at 326 to see if can be verified in other images from other viewpoints. If it cannot be verified in any other images, then that detection is an example of a false positive. The original CNN detection and its associated image and bounding box are annotated as "not an object."

CNN Training

The invention provides a method to improve the accuracy of a CNN by generating hard examples and training or retraining a CNN-based object detector.

Figure 5:
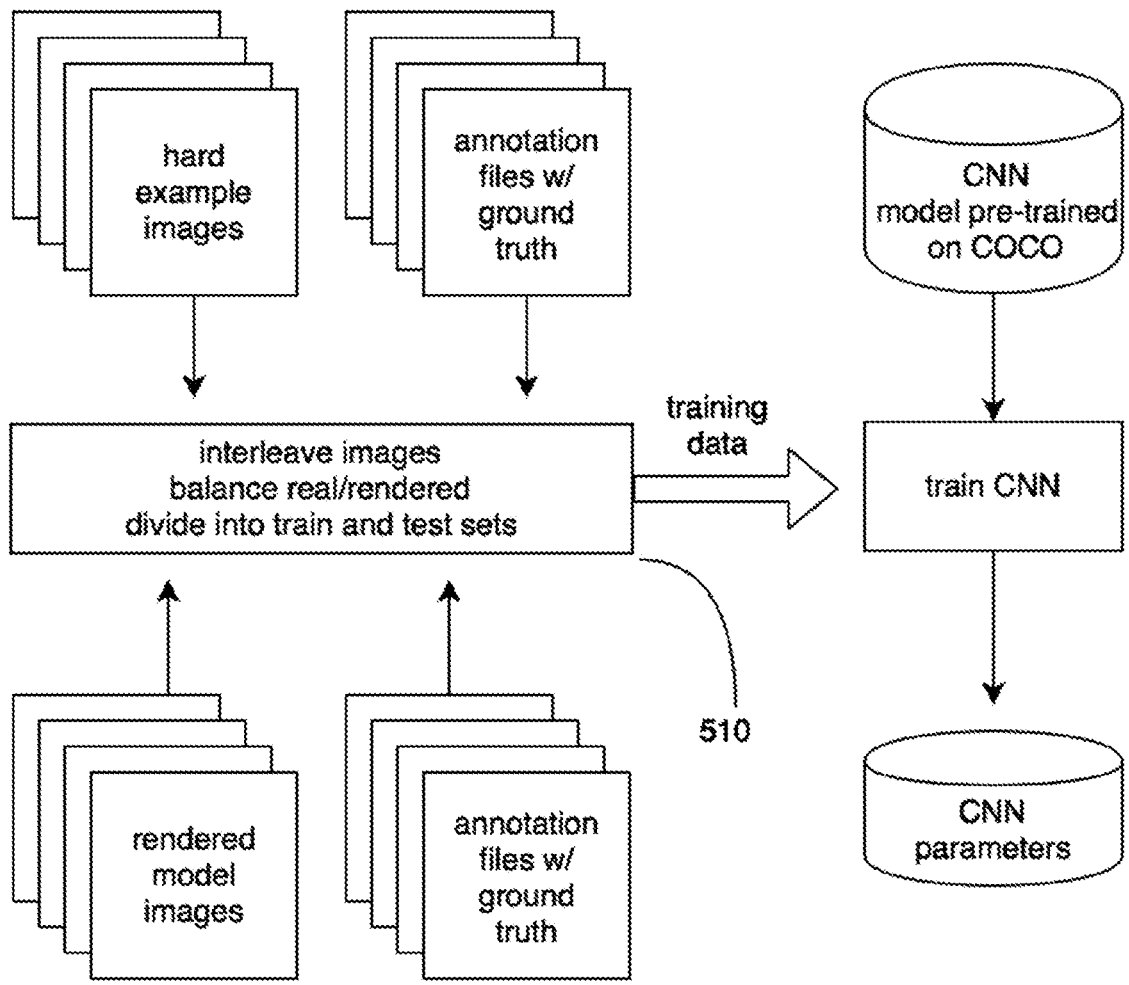
FIG. 5: Training a second CNN-based object detector

FIG. 5 illustrates how data collected can be used in conjunction with other training data. A training dataset is a combination of images and corresponding annotations. A training dataset is created by combining, at 510, the newly collected hard example data with previously generated training images. The balance between the two sets of data can be controlled to limit overfitting to the new examples.

3D Object Model Refinement

The invention provides a method to improve the quality and accuracy of 3D models of physical objects that appear in a physical space.

The system described uses 3D models of the physical objects which are to be detected. The 3D models are used in two ways; first, to create training data for the CNN-based object detection and second, to create rendered images to be used during pose refinement. In addition, such models could be used to render an image of the physical space as it is currently understood, in other words to recreate the physical space with objects shown in their proper locations. To some extent the performance of the system depends on the quality of these 3D models. If they do not closely resemble the actual, physical objects, then poor detection accuracy can result, or poor pose estimation accuracy can occur. For these reasons it can be useful to improve the quality or accuracy of the model. This feature allows the system to start with inferior models to get started, and then, as it is working, to refine the 3D models.

For example, the physical space may be a room in a restaurant, and the objects in the room would be tables, chairs, and people. As a preparatory step, the tables and chairs could be scanned with a 3D scanner or modeled with photogrammetry. Alternatively, 3D models could be made using a CAD system, or they might be available on the Internet. Millions of handmade CAD models are available on the Internet in so-called "model warehouses." Often scanned models are inaccurate geometrically, and lack small details. CAD models may be geometrically simplified, and usually will not have an accurate representation of the surface color, reflectance, and texture of the object.

(Detection of people usually doesn't require such precise models; often the detector is trained to detect generic people, not specific ones. On the other hand, tracking systems must be able to distinguish one person from another without having seen them before. Human pose tracking systems are trained on detecting the different parts of the body, which are then tracked from frame to frame. Many types of people tracking systems have been developed; the field is constantly improving. We will not dwell on describing any in detail. The invention described can be used, nevertheless, for the detection of people, and for enhancing such systems with multiview verification, hard example generation, and model optimization.)

An Object Model Refinement process will adjust parameters to improve the 3D models.

Figure 6:
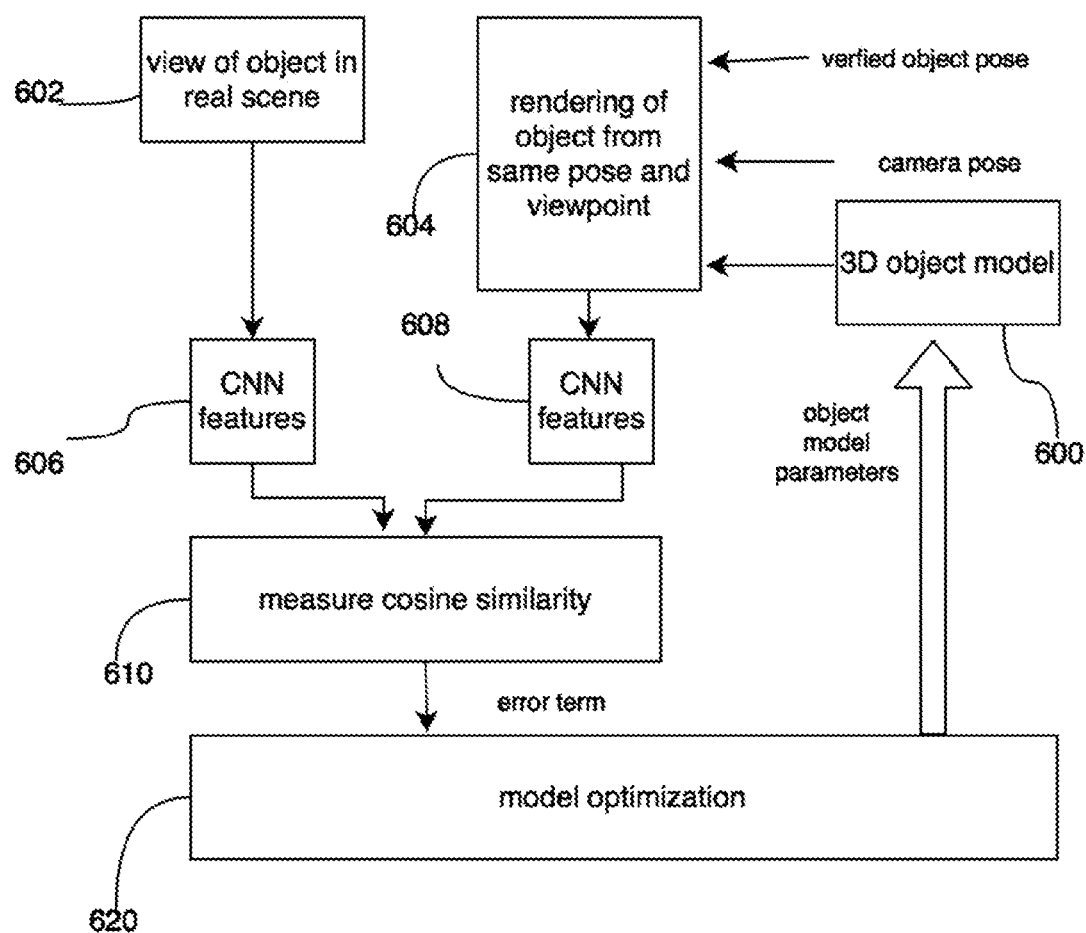
FIG. 6: Model Refinement

3D Object Model Refinement is an iterative optimization process that brings the rendered model closer to the observed physical object by minimizing a feature-based error. This process will be described with reference to FIG. 6.

As described previously, the invention will produce a verified object pose and it will render an image of that object model in the precise pose that it appears from an input camera view. If the model were perfectly accurate and lit in the same way as the real physical space, each pixel of the rendered model would match (in RGB color) the pixels of the input camera view.

A first 3D object model 600 of a physical object exists (but may be inaccurate or incomplete). A plurality of input images 602 are collected which show the physical object. Through pose estimation and multiview verification the object pose in these images becomes verified.

The 3D object model, in the verified object pose, is rendered by a rendering engine 604 in the same pose and from the same viewpoint as in one of the input images 602. In one embodiment the light sources in the physical space are also estimated or known, and are employed in the rendering to make it look more realistic. The projection and rendering of the first model onto the images allows the system to estimate an initial mask of the pixels which "belong to" the object in each of the input images. Based on this initial mask an image segmentation algorithm may be applied to the images; the observed object is segmented from the background. Otherwise a simple bounding box may be used to isolate the region within the real image.

At 606 the CNN features are computed from the region of the real image. RBG pixels are the input to a CNN and the output is a vector. The CNN can be one that was trained on a generic object detection task, or one trained specifically for this task.

At 608 the CNN features are extracted from the parallel, similar region of the rendered image. At 610 the CNN features are compared to produce an error term. The feature comparison can be a similarity measure such as the cosine similarity. The error term may be derived from the similarity by a simple formula, such as:

Error=1−similarity. The cosine similarity produces values between 0 and 1.

In this way, an error term can be produced for each image. For of a set of images, corresponding to multiple views of one verified pose, the error terms may be summed.

The same object may also have been identified in another set of images in another verified pose. These images are also analyzed, and error terms are computed in the same way.

Model Optimization 620 adjusts the model parameters to minimize an error term. The error term represents the difference between the true object and the 3D model of the object. The optimization makes small incremental changes to the parameters of the object model. While clearly this can be a high dimensional space, and these measures may be expensive to compute, this model optimization task could be performed off-line and is usually not time critical.

The term "model parameters" is meant to be general and inclusive. In the case of rigid 3D models, it can include a simple monotonic value such as scale; the scale of the model would be refined to match the size of the real object. Parameters may also describe the shape or structure of the model, for example a 3D grid of voxel occupancy. Parameters may also describe the surface color, texture, transparency, or reflectivity. In the case of deformable objects, the parameters could describe the deformation, for example the relative position of a person's limbs to their body or the seat of a swivel chair relative to its base. Parameters could control the stochastic or algorithmic generation of appearance, shape or color. Plants and trees, for example, can be modeled from parameters describing the branch and leaf probabilities.

In the preferred implementation the optimization is iterative. A process repeatedly adjusts the model to bring the error lower. The basic model optimization step is straightforward. A new set of model parameters, are proposed. For every image in a collection of images, an image of the new model is rendered, the deep features are compared, and an error term is recorded. This creates an error term from each viewpoint. Based on this plurality of error terms, which may be summed, a decision is made whether the new model is better or worse than the previous one.

In one embodiment, the model optimization task is performed by a neural net which has been trained to generate object model parameters.

The methods described can be implemented in a variety of different computing platforms, including distributed systems. The invention can be described as an apparatus in which each function is performed by a module. As already referenced, the input to the system is a plurality of real images of one or more objects from a plurality of viewpoints. These pictures may be transmitted over a network. These pictures are each analyzed by an object detector. In a distributed system, this task may be divided up between a number of processes or processors. Likewise, the pose estimator may be distributed; it could be embodied by multiple processes or processors configured to estimate pose from said real images. The creation of rendered images of 3D models is a common function of a graphics library or rendering engine, that is either all software or done by a combination of software and a Graphics Processing Unit (GPU). Today the most efficient tool for calculating CNN features is also the GPU. Naturally, using a different kind of processor, for example one designed to accelerate neural network computations, would be an expected transferal of the technology described.

The foregoing invention has been described in accordance with the relevant legal standards, thus the description is exemplary rather than limiting in nature. Variations and modifications to the disclosed embodiment may become apparent to those skilled in the art and fall within the scope of the invention.

We claim:

1. A system for automatically training a CNN (Convolutional Neural Network), the system comprising:
    a computer processor and one or more non-transitory computer readable storage media configured to execute the steps of:
    initializing a set of training data with a plurality of annotated images of an object;
    initializing a CNN;
    proceeding, starting with the initial set of training data to iteratively enlarge the set of training data by repeating the steps of:
    training the CNN with the set of training data;
    using the CNN to process a first image and make a first estimate of the position of the object in physical space;
    using the CNN to process a second image to make a second estimate of the position of the object in physical space;
    computing, by using geometric constraints between the first estimate and the second estimate, a more accurate position of the object in three translational dimensions;
    computing, by minimizing measurements of feature distance between features of the first and second images and features of images of the object in known rotational positions, a more accurate position of the object in three rotational dimensions;
    back-projecting the object into a third image and annotating the third image with the more accurate position in at least two translational dimensions and with the more accurate position in at least two rotational dimensions; and
    adding the annotated third image to the set of training data.

* * * * *